June 30, 1953  J. B. THOMAS  2,643,907
CULINARY UTENSIL
Filed Sept. 14, 1951
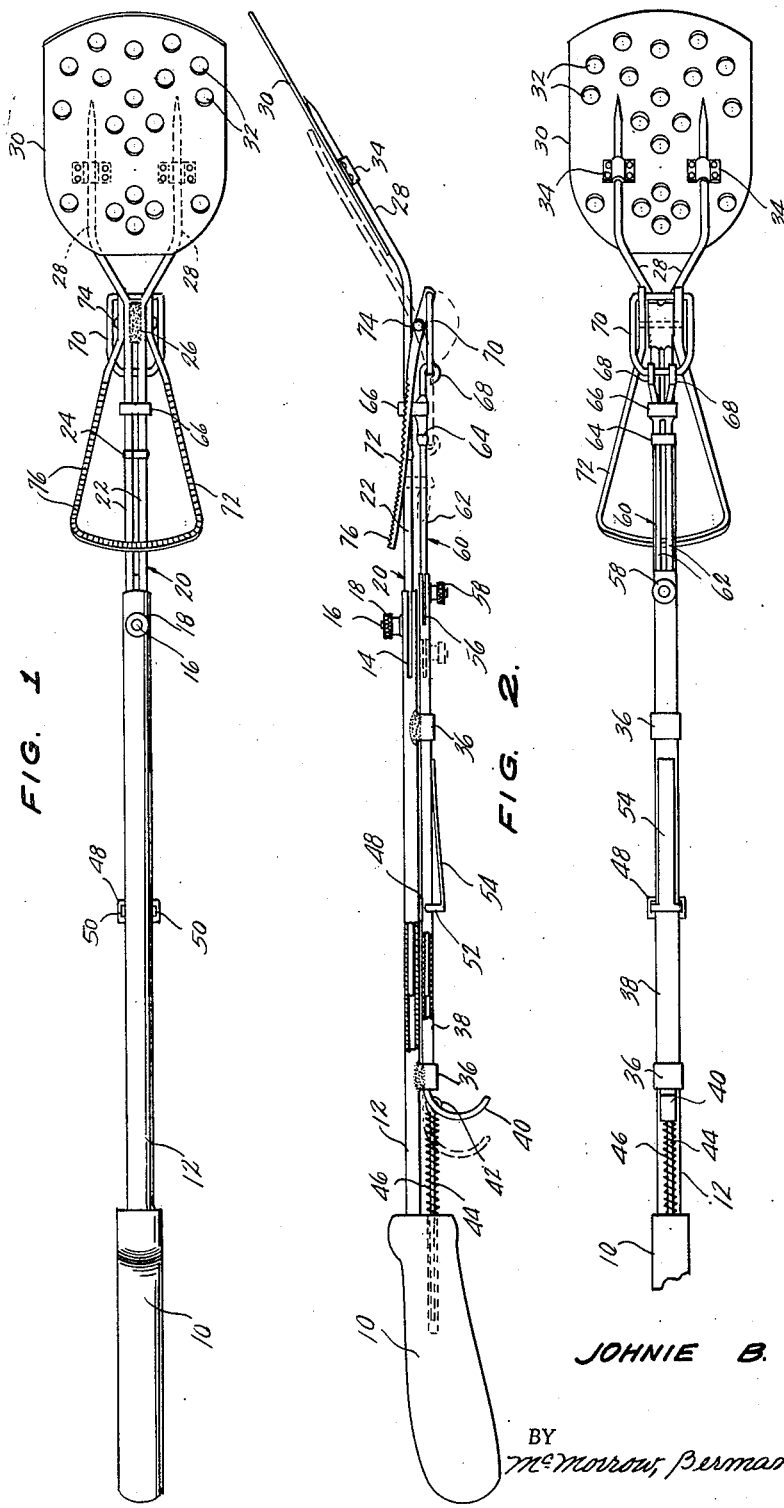
INVENTOR
JOHNIE B. THOMAS,
BY
McMorrow, Berman + Davidson
ATTORNEYS Patented June 30, 1953

2,643,907

UNITED STATES PATENT OFFICE 2,643,907

CULINARY UTENSIL

Johnie B. Thomas, Bamberg, S. C.

Application September 14, 1951, Serial No. 246,578

1 Claim. (Cl. 294—7)

This invention relates to culinary utensils, and more particularly, has reference to a combined cooking fork and spatula adapted for the handling of cooked foods during the preparation thereof.

An important object is to provide a utensil of the type stated which will be usable in any of a plurality of ways, as for example, in preparing hamburgers or other meats, boiled eggs, boiled potatoes, patties, and the like.

Another important object of the invention is to provide a utensil of the type stated which will efficiently grip the food while the food is being placed in or removed from a sauce pan or like receptacle.

Another important object is to provide a utensil of the character described having incorporated therein a means for efficiently gripping the food, with said means being readily shiftable between operative and inoperative positions.

Yet another object is to provide a utensil of the type stated wherein the means described above is controllable from a location close to the handle of the utensil, so as to permit operation of said means with one hand, while the hand is grasping the handle.

Still another important object is to provide a utensil of the character described having a cooking fork at one end, the tines of said fork being adapted to receive sleeves mounted upon a paddle, for ready attachment of said paddle in a manner operative to convert the fork into a spatula.

Yet another object is to provide a food gripping means which will be operative to grip the food whether the utensil is being used as a cooking fork or as a spatula, and which when swung to an inoperative position will permit the use of the utensil as a conventional fork or spatula.

Still another important object is to provide, in a utensil of the type stated, a construction wherein the relative positions of the food gripping means and the fork or spatula can be adjustably varied, so as to control the extent of movement of the food gripping means between the operative and inoperative positions thereof.

Yet another object of the invention is to provide a means for adjusting the overall length of the utensil, so as to adapt the utensil for use on stoves or ovens of different sizes.

Other objects will appear from the following description, the claims appended thereto, and from the annexed drawing, in which like reference characters designate like parts throughout the several views, and wherein:

Figure 1 is a top plan view of a culinary utensil formed in accordance with the present invention;

Figure 2 is a side elevational view, the dotted lines illustrating an operative position of the food gripping means; and Figure 3 is a bottom plan view, portions of the handle being broken away.

Referring to the drawings in detail, a handle 10 is of any desired configuration, and is formed at its inner end with a socket in which is rigidly mounted one end of an elongated tubular body 12. The other end of the tubular body 12 is formed open, and extending longitudinally of the tubular body 12 from the open end thereof are diametrically opposite clamping slots 14.

Secured to the body 12, in closely spaced relation to the open end thereof, is a screw 16, disposed transversely of and between the slots 14. A clamping nut 18 is threaded upon the screw 16.

Extended into the open end of the tubular body 12 is one end portion of an extension member generally designated 20, that is formed of a pair of elongated, parallel rods 22 rigidly connected in spaced parallel relation exteriorly of the body 12 by a transversely disposed band 24.

The clamping screw 16 is interposed between the rods 22, and thus, on loosening of the nut 18, the extension member 20 can be adjusted longitudinally of the tubular body 12, after which tightening of the nut 18 is operative to contract the split end of the tubular body, so as to cause the body to grip the rods 22 tightly and hold the extension member against movement relative to the body, from any position to which said extension member is adjusted.

The extension member and tubular body 12 together define an elongated, longitudinally extensible body portion of the utensil.

For the purpose of imparting still further rigidity to the connected rods 22, said rods are soldered together as at 26, and adjacent the soldered connection 26, the free end portions of the rods 22 are extended in diverging relation, to form spaced tines 28 of a cooking fork.

A flat paddle 30 is formed with a plurality of openings 32, and secured to the underside of said paddle are laterally spaced sleeves 34, so that the paddle may be mounted upon the tines in overlying relation thereto, the tines being received within and being frictionally gripped by the respective sleeves.

It is thus seen that the utensil may be used either as a cooking fork or as a spatula, as desired. If the utensil is to be utilized as a cooking fork, the paddle 30 is removed. Or, if it is desired to convert the implement into a spatula, the paddle 30 is readily applied to the tines. In either event, the tines and spatula are inclined obliquely to the longitudinal axis of the body portion of the device, as readily noted from Figure 2.

Soldered or otherwise fixedly connected to the tubular body 12, at locations spaced longitudinally of said body, are coaxial guide rings 36, in which is slidably mounted an elongated, movable member 38. The member 38 is in the present instance of tubular formation and fixedly mounted in one end thereof is a depending, arcuate finger grip 40 having spaced openings therein receiving a hook 42 formed upon one end of a push rod 44. A spring 46 surrounds the push rod 44, abutting at one end against the finger grip 40, and at its other end against the handle 10. The spring 46, being held under compression, normally urges the finger grip and movable member 38 to the full line position thereof seen in Figure 2. However, one grasping the handle 10 is enabled to extend the finger of his or her hand around the finger grip 40, so as to shift the movable member longitudinally of the body portion of the device, to the dotted line position illustrated in Figure 2.

Fixedly secured to the body 12, intermediate opposite ends thereof, is a transversely disposed plate 48, having laterally spaced openings 50, said openings 50 being adapted to receive upturned fingers 52 formed upon one end of a spring tongue 54. The other end of the spring tongue is fixedly secured to the underside of the movable member 38. When the movable member is in the full line position thereof seen in Figure 2, the fingers 52 are biased into the openings 50. The movable member 38 is thus locked against movement to the dotted line position thereof. If, however, it is desired to shift the movable member to said dotted line position, the user swings the spring tongue 54 outwardly, so as to disengage the fingers 52 from the openings 50.

In the other end of the movable member, longitudinal slots 56 are formed, cooperating with a clamping screw and nut 58 mounted similarly to the screw and nut 16, 18, so as to clamp to the movable member, in selected positions of adjustment longitudinally thereof, an extension arm generally designated 60. The extension arm 60 is telescopically received within the movable member 38, and comprises a pair of parallel rods 62 fixedly connected exteriorly of the movable member by a band 64.

The extension arm 60 and the movable member 38 cooperate to define a longitudinally extensible slide mounted upon the body portion of the device, for movement longitudinally of said body portion.

Adjacent their free ends, the rods 62 are rigid with a guide sleeve 66 extending around and having sliding movement upon the rods 22 of the body portion.

At their free ends, the rods 62 are formed with hooks 68 pivotally connected to one end of a generally rectangular link 70. At its other end, the link 70 is pivotally connected to one end of a U-shaped jaw 72, fulcrumed intermediate its ends upon a pivot pin 74 carried by the rods 22 and disposed transversely of the body portion of the device.

The jaw 72 is swingable between inoperative and operative positions shown in full and dotted lines, respectively in Figure 2. It will be appreciated that normally, the jaw 72 is disposed inoperatively, under the action of the push spring 46. However, when it is desired to swing the movable jaw into contact with the tines 28 or paddle 30, as the case may be, the finger grip 40 is grasped to shift the slide longitudinally of the body portion toward the left in Figure 2, and this action is operative to swing the jaw 72 to the dotted line position thereof illustrated in Figure 2. In this way, a piece of food, not shown, will be firmly gripped between the jaw and the fork or paddle, so as to permit said food to be placed in or removed from a sauce pan or the like, without possibility of the food dropping from the utensil.

The jaw 72 has teeth 76, to grip the food more securely.

The construction illustrated and described is such as to permit the jaw 72 to be previously set in any of a number of selected inoperative positions. By loosening the nut 58, the arm 60 can be telescoped further into the movable member 38, and this has the effect of swinging the jaw 72 upwardly to a selected inoperative position in which it is spaced more closely to the tines or paddle of the implement. This is desirable so as to permit the food to be grasped between the jaw and the tines or paddle with greater rapidity. For example, if the food being cooked is relatively flat (as for example, meat patties, hamburgers, or pancakes), the jaw 72 can be set in advance in a selected inoperative position in which it is spaced rather closely to the tines or paddle. If, however, the food item is relatively thick, as for example boiled eggs or potatoes, the jaw 72 can be set at an inoperative position in which it is spaced a substantially greater distance from the fork. It is to be noted, in this connection, that in that inoperative position of the jaw 72 in which it is spaced its maximum distance from the fork, the jaw is swung rearwardly away from the fork to overlie the body portion of the utensil, the jaw in this position thereof lying almost flat against the body portion and having that part thereof, extending from its pivot 74 to its free end, arranged at that side of pivot 74 remote from the food-supporting means.

It is an important characteristic of the invention, further, that the overall length of the utensil can be adjusted, by loosening both the nut 18 and the nut 58. By so doing, the extension member 20 of the body portion can be telescoped further into the tubular body 12, and this will have the effect of also shortening the overall length of the slide having the movable jaw pivotally connected to said extension member 20.

It is also of importance that the device can be used either as a spatula or cooking fork. When the device is used as a fork, it can be used in the conventional manner, with the jaw 72 being retained in inoperative position so as not to interfere with conventional use of the tines 28. However, if it is desired to remove from a pan such items as boiled eggs or potatoes, the jaw 72 can be swung to a position to cause the item of food to be gripped securely between said jaw and the tines of the fork.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the claim appended hereto.

What is claimed is:

In a cooking utensil, the combination of a longitudinally extensible body portion including a handle at one end and a food-supporting means at its other end, said body portion including a tubular body, an extension member telescoping therein, and means for clamping the extension member to the body in selected positions of telescopic adjustment thereof, said handle being mounted upon the tubular body and the food supporting means being mounted on said extension member; a longitudinally extensible slide mounted upon the body portion in parallelism therewith and having straight-line movement in opposite directions longitudinally of the body portion, the slide including a tubular member slidably mounted upon said tubular body exteriorly of the body, an extension arm telescoping within the tubular member, and means for clamping the extension arm to the tubular member in selected positions of telescopic adjustment thereof; a spring held under compression between the tubular member and the handle and normally biasing the slide in one direction away from the handle; and a jaw adapted at one end for coaction with the food-supporting means to grip an article of food therebetween, the jaw being pivoted near its other end upon the extension member of the body portion in close proximity to said means to swing about an axis related perpendicularly to the line of movement of the slide and having a pivotal connection at said other end of the jaw to the extension arm of the slide, for rocking of the jaw to an operative food-gripping position responsive to movement of the slide toward the handle against the action of the spring, and to a normal inoperative position in which it is in spaced relation to the food-supporting means, the jaw, in the normal inoperative position thereof, having that part of its length disposed between its pivot point and its food-gripping end positioned substantially flat against the extension member of the body portion at that side of the pivot point remote from the food-supporting means, said jaw swinging to its normal inoperative position responsive to movement of the slide away from the handle under the action of the spring, said slide being extensible to selected lengths independently of the body portion to pre-set the jaw at a selected inoperative position relative to the food-supporting means, the jaw being spaced a greater distance from the food-supporting means when disposed in its normal inoperative position, than in any of said selected inoperative positions thereof, withdrawal of the extension member from said body portion being effective to cause withdrawal of the extension arm from the tubular member of the slide, through the medium of the connection of the jaw to the extension member and extension arm respectively, whereby the body portion and slide may be extended simultaneously to adjust the utensil as to the overall length thereof.

JOHNIE B. THOMAS.

References Cited in the file of this patent

UNITED STATES PATENTS

| Number | Name | Date |
| --- | --- | --- |
| 562,719 | Freeman | June 23, 1896 |
| 1,326,570 | Burmeister | Dec. 20, 1919 |
| 1,532,020 | Angelides | Mar. 31, 1925 |
| 2,031,183 | Sonnenburg | Feb. 18, 1936 |
| 2,096,391 | Cringle | Oct. 19, 1937 |
| 2,110,640 | Aldrich | Mar. 8, 1938 |